J. POWERS.
MULTISORTING MACHINE.
APPLICATION FILED FEB. 10, 1916.

1,310,433.

Patented July 22, 1919.
8 SHEETS—SHEET 7.

Witnesses:
Frank Faggiani
H. D. Penney

Inventor:
James Powers
By his Att'y,

UNITED STATES PATENT OFFICE.

JAMES POWERS, OF NEW YORK, N. Y., ASSIGNOR TO POWERS ACCOUNTING MACHINE COMPANY, OF NEW YORK, N. Y., A CORPORATION OF DELAWARE.

MULTISORTING MACHINE.

1,310,433.          Specification of Letters Patent.       Patented July 22, 1919.

Application filed February 10, 1916. Serial No. 77,386.

*To all whom it may concern:*

Be it known that I, JAMES POWERS, a citizen of the United States, residing in New York, in the county of New York and State of New York, have invented certain new and useful Improvements in Multisorting Machines, of which the following is a specification.

This invention relates to methods of sorting by card accounting machines and especially to a method for sorting a plurality of cards simultaneously and to the machine for carrying out such method.

The method consists essentially in sorting with apparatus having a plurality of sorting machines, in number corresponding to the number of possible assortments, each machine comprising a card feed, a single pin analyzing mechanism, setting mechanism operated by said analyzing mechanism, a sorted card receptacle, an unsorted card receptacle, and deflectors controlled by said setting mechanism whereby the unsorted cards will be ready again to be passed through.

In the arrangement, if there are ten machines for instance to correspond to the first ten integers "1" to "10" inclusive, the machines may be placed in a row along side of one another, and the analyzing mechanism of the first one of the row set to sort out the assortment "1", the analyzing mechanism of the next in the row adjacent to said first one, set to sort out the assortment "2", and the remaining machines of the row set to sort out assortments consecutively from "3" to "10" so that the end sorting machine will be set to sort out assortment "10".

With the foregoing arrangement, the pack of record cards to be sorted will be distributed in the several card feeds of the several sorting machines, the machines thereupon started whereupon the cards of the several feeds will be fed through the several analyzing mechanisms, the cards unsorted separated out and discharged into the unsorted card receptacles, and the resulting several collections of unsorted cards then placed in the card feeds of adjacent machines one higher in order of assortments to be passed through their analyzing mechanisms, the cards removed from the unsorted receptacle of the "10" assortment sorting machine removed and placed into the card feed of the "1" assortment sorting machine, and this removal of unsorted cards and introduction thereof into other card feeds repeated until all the cards have been eliminated or sorted.

A particular object of the present invention is to provide a machine whereby the foregoing method can be carried out.

With machines of the class above outlined, it is also desirable to disengage the card feed with facility, and to properly pack the cards in the order in which they are discharged in the receptacles provided for their reception. To this end, and by which the aforesaid, as well as other features, capabilities and advantages of the invention are made possible, one specific embodiment of the invention has been contrived which is illustrated in the accompanying drawings in which—

Fig. 3 is a section on the line 3—3 of Fig. 2.

Figure 16:
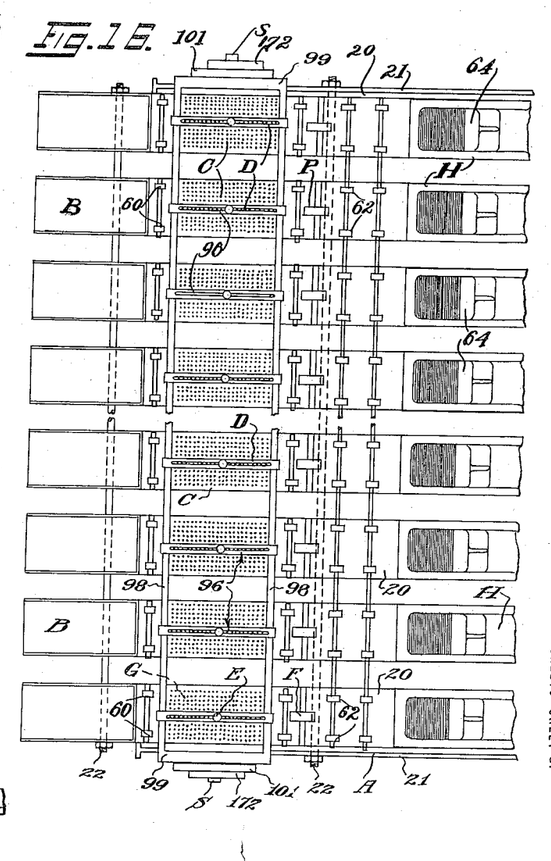
Fig. 16 is a diagrammatic plan view showing the relative positions of the several elements of a complete machine.

In the embodiment illustrated a machine for carrying out the method constituting the present invention comprises essentially (see Fig. 16), a main frame A inclosing a plurality of sorting machines in the present instance ten in number, each having a card hopper B, a pin box portion C on which the carriage D for mounting the analyzing pin E is slidably mounted, deflectors F which are operatively connected with setting mechanism G (Fig. 3), and receptacles denoted generally by H in which the cards discharged from the pin box are deflected by the deflectors F according to the setting of the setting mechanism G.

Figures 1, 14:
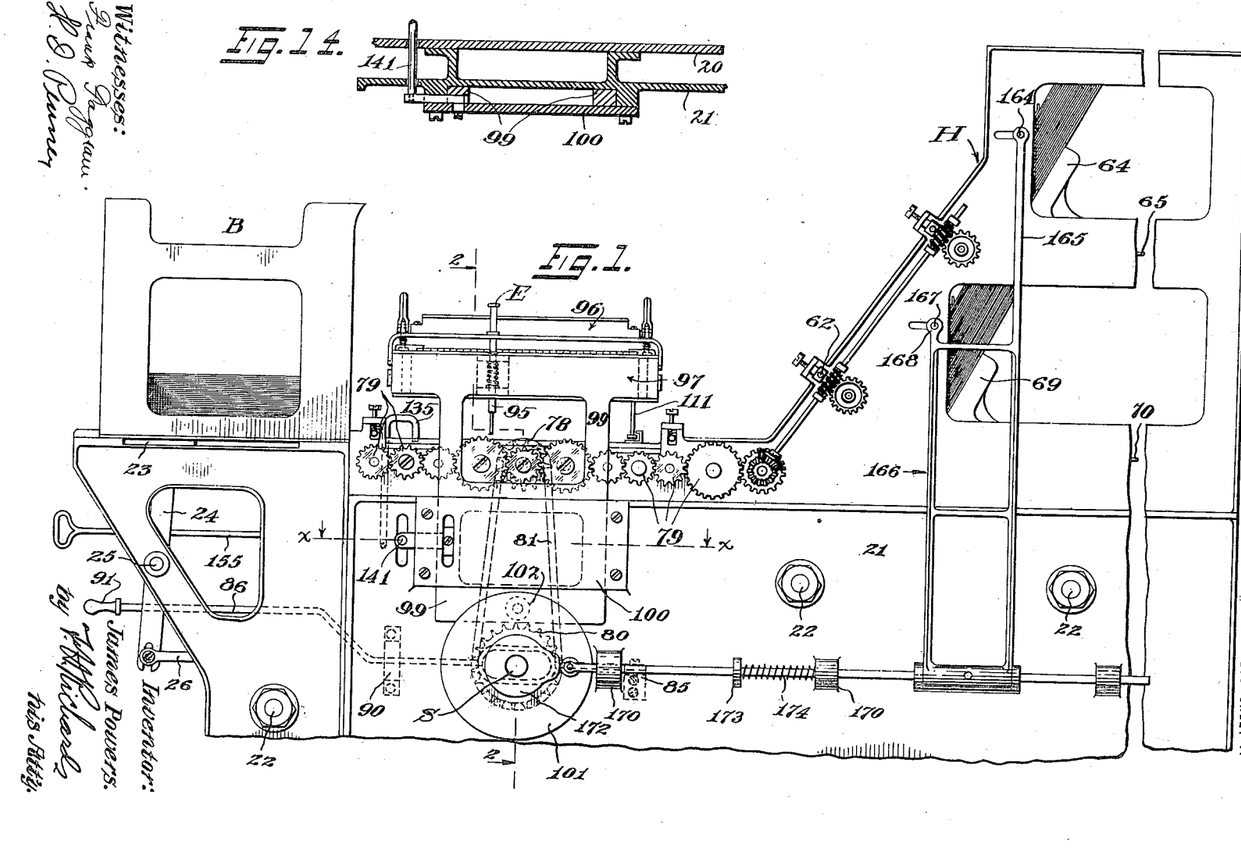
Figure 1 is a side elevation of the apparatus.
Fig. 14 is a section on the line $x$—$x$ of Fig. 1.

The several sorting machines which have downwardly projecting frame portions 20 are secured to the side walls 21 of the main frame A by means of the tie rods 22, three being shown in the present instances (Figs. 1 and 3). Also extending through all of the sorting machines and common to them all is the main driving shaft S.

As constituting elements of the several sorting machines which are independent of one another (see Fig. 3), are the following: a card hopper B in the bottom of which a card picker 23 is reciprocably mounted by connection to the lever 24 fulcrumed on the shaft 25 and pivotally connected at its lower end to the rod 26 which is slidably mounted in the bearing 27 and coöperates with the bore of the cylindrical portion 28 which is mounted in the bearing 29 and has on its inner end a roller 30 resiliently held in engagement with the cam 31 fixed on the shaft S by the spring 32 connecting the lug 33 with the bearing 29.

Disposed above the shaft S is the depressible member 34 comprising essentially a box-like member having an upper plate portion 35 and two downwardly extending side portions 36 which are guided by the projections 37 secured to the wall members 20. The depressible member 34 is resiliently held in its upper position by the levers 38 fulcrumed on the shaft 39, the levers 38 engaging the side portions 36, and being maintained in supporting position by the springs 40 secured to the rear arms 41 of the levers 38. The rear arms 41 are disposed to coöperate with the recessed front arms 42 of the reciprocating rods 43 slidably mounted in the bearings 44 and 44' each rod 43 having a pin 45 for engagement by an upwardly extending arm 46 of a bell crank 47 fulcrumed to the shaft 48 with its forwardly extending arm 49 provided with a roller 50 resiliently held in engagement with the cam 51 on the shaft S by the spring 52. The rods 43 are resiliently maintained in their forward position by the springs 53 strained between the bearings 44' and the lower ends of the downwardly extending arms 54, such lower ends being bifurcated and in engagement with the pins 55 on the rods 43. The upper ends of the arms 54 are fixed to the shafts 56 on which the deflectors 57 are fixed, the deflectors 57 having an upwardly extending portion 58 and a rearwardly extending portion 59. The connection of the deflectors 57 with the depressible member 34 is such that when the depressible member is depressed the rods 43 will be released from the arms 41 of the levers 38 and thereby liberated to permit the springs 53 to thrust them forwardly and thereby tilt the deflectors 57 so that their rearwardly extending portions 59 are swung upwardly out of the path of the cards discharged in the manner hereinafter to be described.

Disposed in the path of movement of the cards fed in by the picker 23, are the feed rollers 60 by which the cards fed in by such picker 23 are received, by such rollers 60 fed to the stop plate 71 to be positioned thereby for analysis, and then discharged across the guide plates 61 from which according to the positioning of the deflectors 57 the cards are either directed upward between the feed rollers 62 across the guide plate 63 against the inclined support 64 supported on the floor member 65 of the upper or unsorted card receptacle which floor member 65 is secured to the upwardly extending side wall members 66 or else deflected across the curved guide plate 67 between the feed rollers 68 and then against the inclined support 69 disposed on the floor member 70 of the lower or sorted card receptacle. The stop plate 71 is formed on the upper end of an upwardly extending arm 72 fixed to a rearwardly extending arm 73 which is pivotally connected at its front end to the shaft 74, and provided with a roller 75 resiliently held in engagement with the cam 76 on the shaft S by the spring 77.

Figure 2:
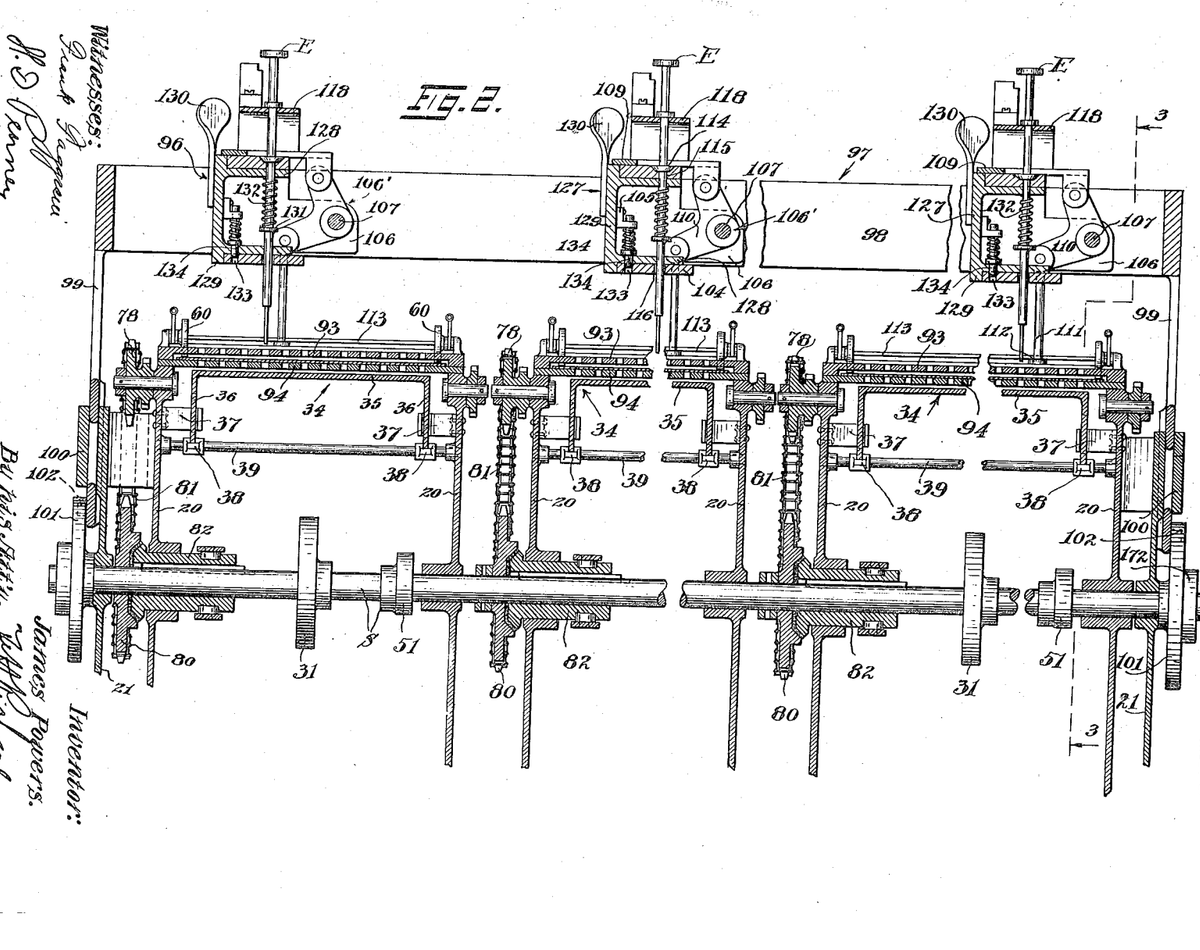
Fig. 2 is a fragmental section on the line 2—2 of Fig. 1.
Figure 4:
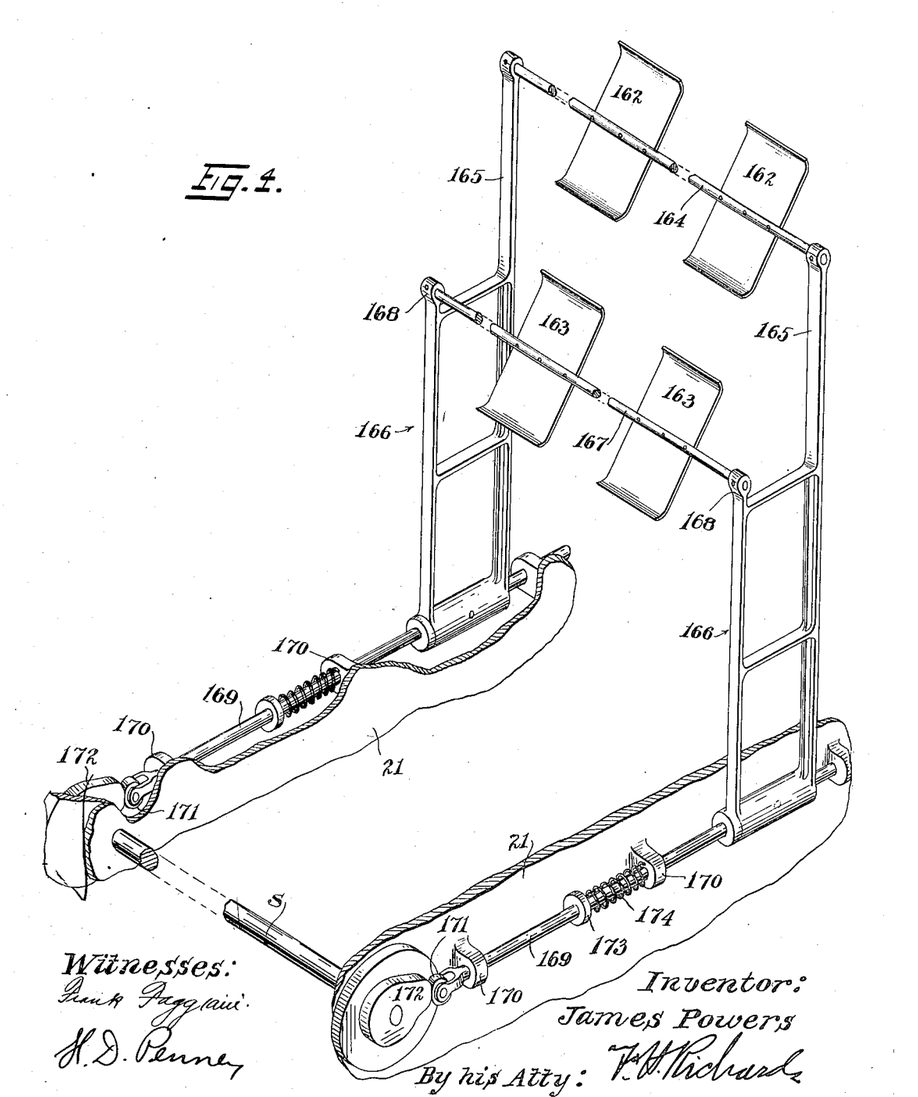
Fig. 4 is a fragmental perspective showing the arrangement of the packers for properly positioning the cards in their receptacles after having been discharged from the machine.
Figure 5:
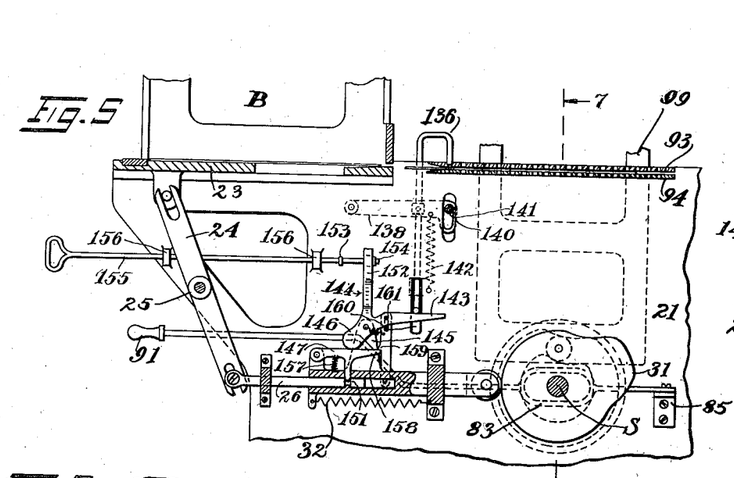
Figs. 5 and 6 are fragmental sectional views showing two positions of the engaging means for the card feed actuating means.
Figure 6:
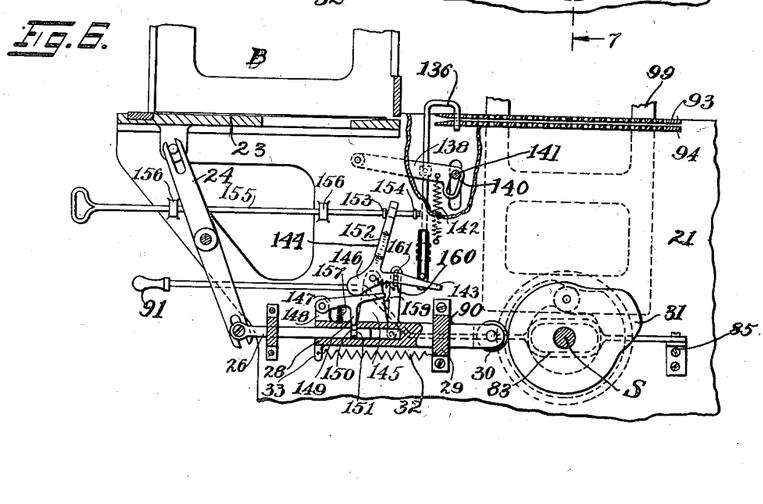

For driving the feed rollers 60 a driving sprocket wheel 78 (Fig. 2) is journaled on the outside of one of the wall members 20 and geared to the shafts of the lower rollers 60, the shafts of the rollers 60 at either end of the downwardly extending portions 36 extending across and connecting the rollers on both sides of the path of movement of the cards, and such shafts being suitably connected to one another by the gears 79 (Fig. 1) in mesh with one another. The driving wheel 78 is connected to the sprocket wheel 80 loosely mounted on the shaft S by the sprocket chain 81. For the purpose of connecting the sprocket wheel 80 to rotate with the shaft S, the clutch collar 130

Figure 11:
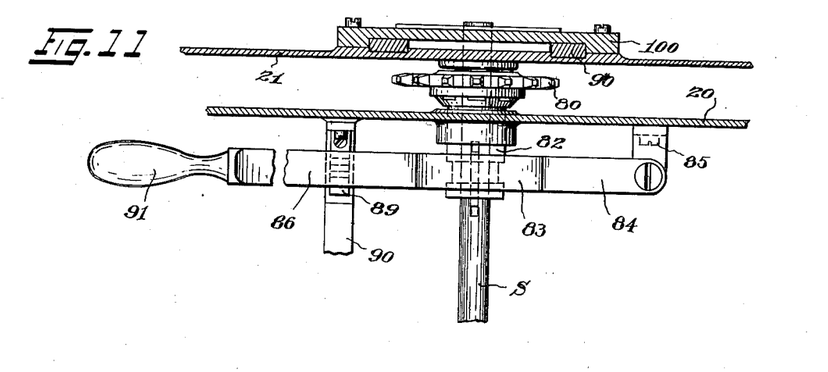
Fig. 11 is a fragmental plan partly in section of the clutch for disconnecting the feed rolls of the cards.
Figure 12:
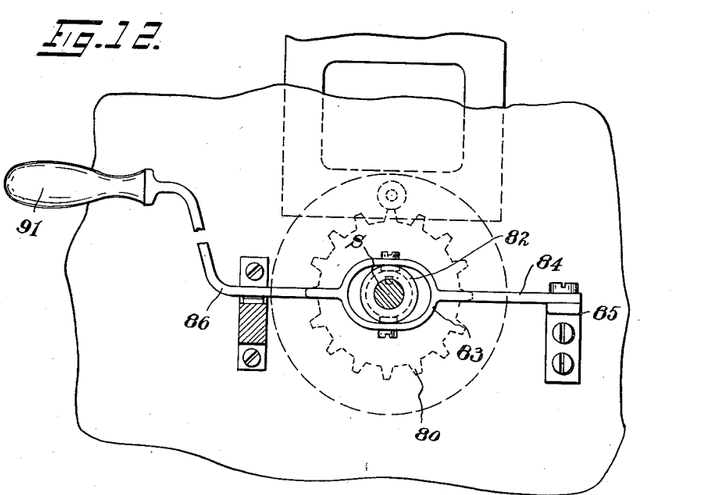
Fig. 12 is a fragmental side elevation of the clutch arrangement shown in Fig. 11.
Figure 13:
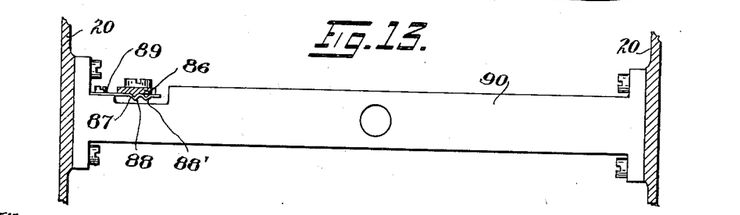
Fig. 13 is an elevation of the support on which the anchoring means are disposed for the clutch lever.
Figure 15:
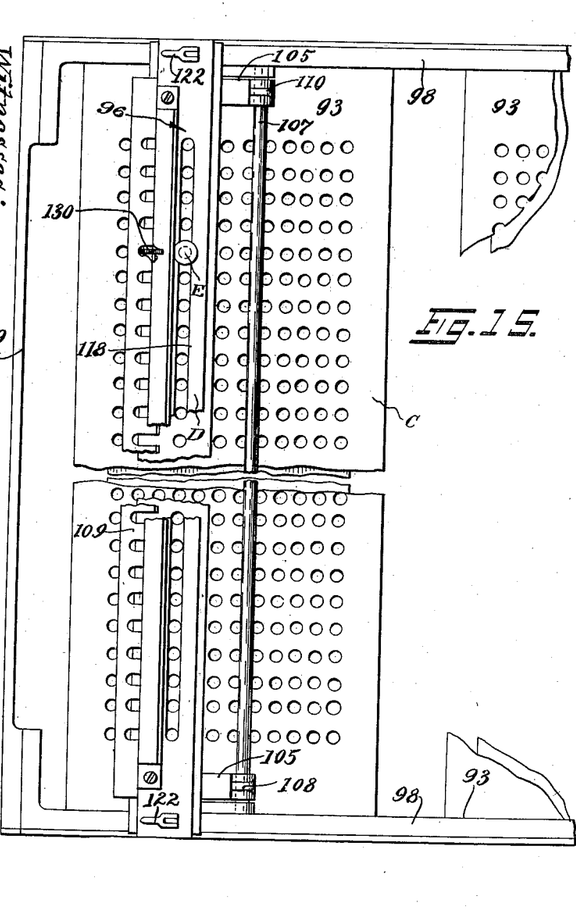
Fig. 15 is a fragmental plan showing the pin supporting carriage in position on the upper perforated plate below which the card to be sorted is positioned.

82 splined to the shaft S is provided, which collar 82 is slidably mounted on said shaft S and pivotally connected by the link 83 (Figs. 11 and 12) surrounding the collar 82. The link 83 has a rearwardly extending arm 84 pivotally connected to the bracket 85, a forwardly extending arm 86 having a downwardly extending lug 87 (Fig. 13), to coöperate with either one or the other of the detents 88 and 88' in the spring 89 which is mounted on the cross bar 90 secured to the walls 20, the forward end of the arm 86 being provided with a handle 91. When the handle 91 is swung so that its lug 87 engages the detent 88, the clutch member 82 will be in engagement with the sprocket wheel 30 and anchor the same to rotate with the shaft S, and on the other hand when the handle 91 is swung so that its lug 87 engages the detent 88', the clutch member 82 will be removed from the sprocket wheel 80 and permit the rotation of the shaft S without the actuation of the sprocket wheel 80. By the foregoing arrangement, the feed rollers 60 may be anchored against actuation whenever desired.

Disposed above each depressible member 34 and secured to the side walls 20 there are provided for each sorting machine a guide plate 93 and a die plate 94 between which the card to be sorted is located for analysis. The plates 93 and 94 are provided with corresponding openings to coöperate with an analyzing pin 95 which is supported on a carriage 96.

As common in sorting machines a vertically reciprocable carriage supporting frame 97 is provided which comprises essentially two elongated end bars 98 extending entirely across the several sorting machines and connected to one another at their ends by the side brackets 99 which are mounted and guided vertically slidable between the outer side walls 21 and the plates 100 secured to the outside of such walls 21. The shaft S extends through the walls 21 and is provided on its ends with cams 101 having cam grooves in which travel the cam rollers 102 which are secured to the lower ends of the side brackets 99. By the aforesaid cam connection, the frame 97 is reciprocated vertically.

Figure 10:
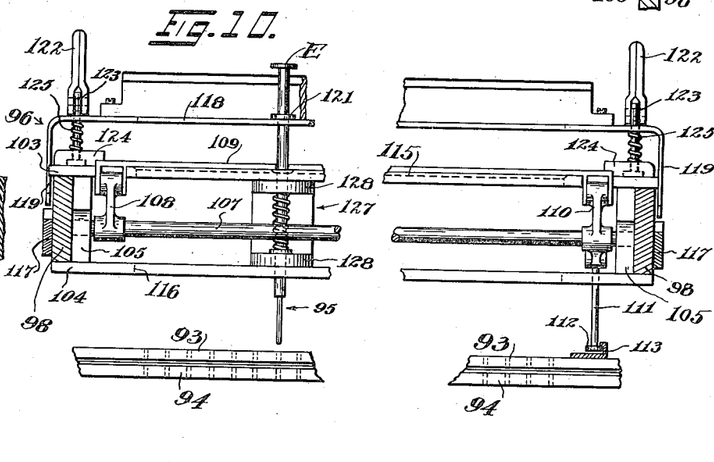
Fig. 10 is a fragmental side elevation of the carriage shown in Fig. 8.

Of the carriages 96, one is preferably provided for each sorting machine and disposed in operative relation thereto. The carriages 96 each comprise essentially an upper bar 103 and a lower bar 104 extending across and disposed on the upper and lower edges respectively of the side bars 98. The bars 103 and 104 are connected to one another by the end members 105. The end members 105 are provided with outwardly projecting portions 106 to afford bearings for the shaft 107, at one end of which shaft 107, link 108 (Fig. 10) is fixed which is pivotally connected at its upper end to one end of the locking plate 109. At the other end of the shaft 107 a bell crank 106' is fixed an upper arm of which is pivotally connected to the other end of the locking plate 109 and the lower arm of which is pivotally connected to the downwardly extending rod 111 which passes through the opening formed in the lower bar 104 and terminates at its lower end in the collar 112 which is slidably disposed in the rail 113. In the bar 103 under the path of movement of the locking plate 109, there is formed an elongated slot 115 through which the pin 95 extends and along which it is slidable, the upper portion of the bar 103 along this slot 115 being chamfered to receive the beveled head 114 of the pin 95. From the foregoing it will appear that when the pin 95 is depressed with its head 114 resting in the chamfered portion of the slot 115 and the frame 97 thereupon descends, the bell crank arm 110 by its coöperation with the rod 111 will draw the locking plate 109 over the edge of said head 114 and positively anchor such pin 95 in its descended position. The lower portion of each pin 95 extends through an elongated slot 116 formed in the bar 104 along which it is slidable. For anchoring the carriages 96 in the frame 97, serrated rails 117 are formed on the outside of the bars 98. For coöperating with these rails 117 each carriage is provided with a transverse bracket 118 which extends parallel to the locking plate 109 above the entire length of a carriage and has downwardly extending portions 119 provided with serrations at their lower ends to engage the serrated rails 117. Along the length of the brackets 118, elongated slots 120 are provided through which the pins 95 extend having heads 121 above such rails 118 which rest on said brackets 118. For actuating a bracket 118 either into disengaged or anchoring position, cam levers 122 one at each end of the bracket 118 are provided. These levers 122 are pivotally connected to rods 123 extending upward through the brackets 118, the lower ends of which rods are fixed to the bar 103 of the carriage by the plates 124. For normally maintaining the bracket 118 in raised position when the cam levers are in disengaged position, the springs 125 are disposed on the rods 123 and strained between the bracket 118 and the plates 124. The cam levers 122 are provided with cams 126 whereby when the levers are depressed they will depress the bracket 118 against the tension of the springs 125 and bring the serrated arms into engagement with the serrated rails 117.

For conveniently positioning the pin 95, the brackets 127 are provided with their horizontal arms 128 positioned snugly against the lower and upper sides of the bars 103 and 104 respectively, and the overhanging edges of their vertical arms 129 engaging the outer edges of the bars 103 and 104. On the vertical arms 129, the finger pieces 130 are secured. The horizontal arms 128 of the brackets 127 are provided with openings through which the pins 95 extend. For resiliently and normally maintaining the pins 95 in their lower position, collars 131 are formed on the pins 95 between which and the upper horizontal arms 128 of the brackets 127, the springs 132 are strained.

For suitably anchoring the brackets 127 in position, the lower bars 104 are provided with a plurality of recesses 133 into which the spring pressed pins 134 engage. The recesses 133 are in alinement with the rows of openings in the plates 93 and 94 while the serrated engagements of the rail 117 with the arms 119 are in alinement with the several openings of a row of openings in said plates 93 and 94 so as to permit anchoring the pins 95 in position for registration with any particular opening desired.

The operation of the pins 95 with the depressible members 34 will be substantially as follows: The pins 95 may be positioned in any of the openings of the plates 93 and 94. Each depressible member is of sufficient area to extend across all the openings of a plate 94. Thereupon when a card is positioned between a set of plates 93 and 94 and a perforation of such card registers with the analyzing pin 95 coöperating therewith, such pin 95 will be permitted to pass therethrough. The successive descent of the carriage 96 will coöperate with its bell crank 106' to positively anchor such analyzing pin 95 in its lower position and consequently the depressible plate 34 under the plate 94 lying in the path of movement of the aforesaid anchored pin 95, will be struck thereby and rock the levers 38 to permit the rods 43 to be thrust forward by their springs 53 and in turn actuate the deflectors 57 to permit the card thus sorted to be fed into the lower or sorted card receptacle.

Figure 7:
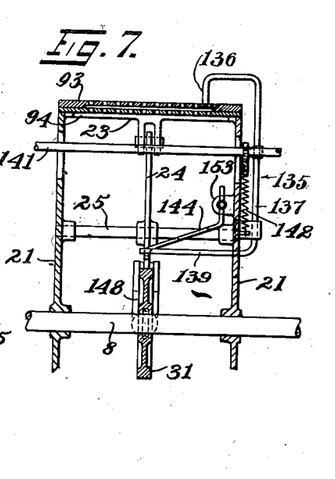
Fig. 7 is a section on the line 7—7 of Fig. 5.
Figure 8:
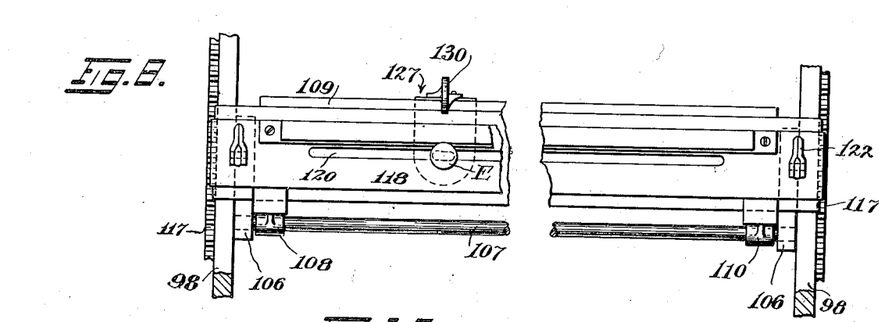
Fig. 8 is a fragmental plan of the carriage on which the analyzing pin is mounted.
Figure 9:
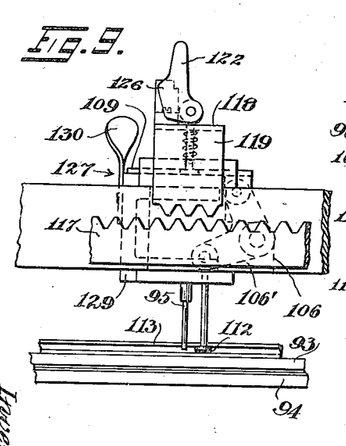
Fig. 9 is a fragmental end elevation showing the carriage illustrated in Fig. 8.

For automatically disconnecting the pickers 23 from actuation, whenever the card supplies have been exhausted or for any other reason no card is positioned between plates 93 and 94, the bent rods 135 (Fig. 7) are provided one for each sorting machine, each preferably having a downwardly extending finger 136 at its upper end which coöperates with the register stop holes in the plates 93 and 94, an intermediate arm portion 137, and a lower inwardly extending portion 139. To the arm portion 137 the lever 138 is pivotally connected. The lever 138 is fulcrumed at one end to one side wall 20 and its other end is formed into a link 140. Through all of the links 140, a common reciprocating rod 141 extends which is connected to the downwardly extending brackets 99 of the frame 97. For normally maintaining the levers 140 under tension in a downward direction, the springs 142 are provided which connect the levers 138 with the side walls 20.

The lower inwardly extending portions 139 of the bent levers 135 extend over and rest on the inwardly extending arms 143 of the Y-shaped levers 144 fulcrumed to the brackets 145. The Y-shaped levers 144 also have downwardly extending arms 146 resting on the levers 147 which are pivoted to the brackets 148 formed on the cylindrical portions 28. The levers 147 have downwardly extending fingers 149 which extend into the openings 150 formed in the cylindrical portions 28. The levers 147 are normally maintained under tension in an upward direction by the springs 157 strained between such levers 147 and the cylindrical portions 28. The rods 26 are provided with recesses 151 adapted to be normally engaged by the fingers 149 to permit the actuation of the card pickers 23. For latching the levers 147 in engagement with rods 26, the latches 158 pivotally connected to the cylindrical portions 28 are provided having spurs 159 to engage the ends of the levers 147. The latches furthermore have slots 160 to engage the pins 161 formed on the arms 143. The Y-shaped levers 144 have upwardly extending arms 152 which extend upwardly between and in the path of movement of the stops 153 and 154 on the shift rods 155 mounted in bearings 156 formed on said walls 20. The operation of the foregoing stop arrangement is substantially as follows: When no card or a stop card is disposed between two plates 93 and 94 of a sorting machine, the finger 136 of a bent lever 135 is free to pass down through the registering stop holes formed in such plates 93 and 94. Then upon the depression of the rods 141 with the brackets 99 the springs 142 connected to the link 138 of the said sorting machine will draw down such link 138 and thereby draw downwardly the finger 136 of the lever 135 whereupon its inwardly extending portion 139 by engagement with the arm 143 will rock the lever 144 thereby rocking the latch 158 to release the lever 147 whereupon the spring 157 will raise the lever 147 out of engagement with the recess 151 of the rod 26 and thus permit the actuation of the cylindrical portion 28 by the cam 31 without actuating the card picker 23. With the rise of the brackets 99, the bent lever 135 will of course again be raised. Then to reconnect the rod 26 with the cylindrical portion 28, it will be necessary to draw out the rod 155 in order that the stop 154 will strike the upwardly extending arm 152 so that and until the finger 149 of the lever 147 again engages the recess 151 of the rod 26.

For packing the cards from the several 13 sorted and unsorted card receptacles, the packing blades 162 and 163 are provided, one of the blades 162 for each of the upper or unsorted card receptacles and one of the blades 163 for each of the lower or sorted card receptacles. The blades 162 are secured to a common shaft 164 extending across all of the upper receptacles and supported by the upper arms 165 of the brackets 166, and the blades 163 are secured to the common shaft 167 extending across all the lower receptacles and supported by the lower arms 168 of the brackets 166. The lower ends of the brackets 166 are secured to the shift rods 169, two being provided, each slidably mounted on the outside of a side wall 21 by the bearings 170. On each rod 169 between the bearings 170 there is formed a collar 173. The front ends of the rods 169 are provided with rollers 171 resiliently held in engagement with the cams 172 on the shaft S by the springs 174 between the collars 173 and the rearward bearings 170.

The cam 172 is timed to actuate the packing blades 162 and 163 for each discharge of a card. The operation is substantially as follows: The carriages D of the ten sorting machines are positioned each on a corresponding row of openings, but with their pins E disposed on different openings one relative to the other, the arrangement being preferably such that the pin E of the first sorting machine will be positioned over the designation character "1", the pin E of the second sorting machine positioned over the designation character "2", and the pins E of the remaining sorting machines consecutively in the same order so that the pin of the last sorting machine will be positioned over the designation character "10". Then the cards to be sorted may be distributed in the several card hoppers B and the driving mechanism started. As the cards pass through the plates 93 and 94 of the several sorting machines, the sorted cards will be deflected by the deflectors F into the lower or sorted card receptacles H and the unsorted cards deflected by the deflectors F into the upper or unsorted card receptacles H. As soon as a supply of cards in a hopper B is exhausted, its picker plate 23 will be stopped by the bent lever 135, whereupon if desirable, pending the refilling of such hopper, the handle 91 may be manipulated to disconnect the feed rollers from actuation. As soon as any card hopper is exhausted, say for instance this were a card hopper of the third sorting machine in which the pin E were set with the designation character "3", the unsorted cards of the preceding sorting machine in which the pin is set for the designation character "2" will be taken and placed in the hopper of the third sorting machine, and thereupon the rods 91 and 155 shifted so that the card feed and feed rollers of this third sorting machine will again operate. In this manner, manipulation of the unsorted cards may be continued, that is whenever a card hopper is exhausted, the unsorted cards disposed in the unsorted card receptacle of the preceding sorting machine may be taken and supplied to the said exhausted card hopper. By this method, it will be seen that the supply of unsorted cards will diminish and may be exhausted even before all the sorting machines have been supplied ten distinct times and at any rate, assuming that all of the cards to be sorted may be sorted by one of the ten sorting machines, the duration of the tenth operation of the sorting machines will be compartively small compared to the first operation in sorting a certain pack of cards.

It is obvious that various changes and modifications may be made to the details of construction and to the several steps of the aforesaid method without departing from the general spirit of the invention.

I claim:

1. A method of sorting cards or similar objects, said method consisting in dividing the cards to be sorted into a plurality of batches; analyzing the cards of each batch, and selecting from each batch all of the cards containing certain data; placing the selected and unselected cards from each batch in a sorted and an unsorted pile respectively; and replenishing the cards of any batch that may be exhausted from the unsorted piles derived from other batches.

2. A method of sorting cards or similar objects, said method consisting in dividing the cards to be sorted into a plurality of batches; simultaneously analyzing the cards of each batch one by one, and selecting from each batch all of the cards containing certain data; placing the selected and unselected cards from each batch in a sorted and an unsorted pile respectively; and replenishing the cards of any batch that may be exhausted from the unsorted piles derived from other batches.

3. A method of sorting cards or similar objects, said method consisting in dividing the cards to be sorted into a plurality of batches; analyzing the cards of each batch and selecting from each batch all of the cards containing certain data different from the data selected from the other batches; placing the selected and unselected cards from each batch in a sorted and an unsorted pile respectively; and replenishing the cards of any batch that may be exhausted from the unsorted piles derived from other batches.

4. A method of sorting cards or similar objects, said method consisting in dividing the cards to be sorted into a plurality of batches; analyzing the cards of each batch and selecting from each batch all of the cards containing certain data; placing the selected and unselected cards from each batch in a sorted and an unsorted pile respectively; and replenishing the cards of any batch that may be about to be exhausted from the unsorted piles derived from other batches.

5. A method of sorting cards or similar objects, said method consisting in dividing the cards to be sorted into a plurality of batches; analyzing the cards of each batch and selecting from each batch all of the cards containing certain data; placing the selected and unselected cards from each batch in a sorted and an unsorted pile respectively; replenishing the cards of any batch that may be exhausted from the unsorted piles derived from other batches; and continuing the operation until all the cards are sorted.

6. A method of sorting cards or similar objects, said method consisting in dividing the cards to be sorted into a plurality of batches; simultaneously analyzing the cards of each batch one by one and selecting from each batch all of the cards containing certain data different from the data selected from the other batches; placing the selected and unselected cards from each batch in a sorted and an unsorted pile respectively; and replenishing the cards of any batch that may be about to be exhausted from the unsorted piles derived from other batches.

7. A method of sorting cards or similar objects, said method consisting in dividing the cards to be sorted into a plurality of batches; simultaneously analyzing the cards of each batch one by one and selecting from each batch all of the cards containing certain data different from the data selected from the other batches; placing the selected and unselected cards from each batch in a sorted and an unsorted pile respectively; replenishing the cards of any batch that may be about to be exhausted from the unsorted piles derived from other batches; and continuing the operation with all of the piles and batches until all of the cards are sorted.

8. A method carried out by the use of an apparatus having a plurality of sorting machines, each set to make a different sorting; a card hopper for each sorting machine for holding the batches to be sorted; an unsorted card receptacle for each sorting machine and means for operating said sorting machines so that the cards placed in said hoppers will be fed into analyzing position, and from there according to their data either conveyed to the unsorted card receptacles or not, such method consisting in dividing the cards to be sorted into a plurality of batches; analyzing the cards of each batch and selecting from each batch all of the cards containing certain data; placing the selected and un-selected cards from each batch in a sorted and an unsorted pile respectively; and replenishing the cards of any batch that may be exhausted from the unsorted piles derived from other batches.

9. In a multi-sorter, the combination of an analyzing device; means for feeding cards thereto; a sorted card receptacle; an unsorted card receptacle placed above the sorted card receptacle in easily accessible position; and means controlled by the analyzing device for conveying cards directly to the sorted card receptacle or upwardly into the unsorted card receptacle.

10. In a multi-sorter, the combination of a sorted card receptacle, an unsorted card receptacle placed near the sorted card receptacle in easily accessible position; means for conveying cards directly to the sorted card receptacle or into the unsorted card receptacle, an unresiliently yieldably supported follower support in each receptacle; and packers for packing the cards into the receptacles.

11. In a multi-sorter, the combination of an analyzing device; means for feeding cards thereto; a sorted card receptacle; an unsorted card receptacle placed near the sorted card receptacle in easily accessible position; means controlled by the analyzing device for conveying cards directly to the sorted card receptacle or into the unsorted card receptacle; packers for packing the cards into the receptacles; and operating means for the packers common to both packers.

12. In a multi-sorter, the combination of a pair of perforated plates; means for feeding cards therebetween; a sorting element adapted to pass through the perforations of said plate and a card therebetween at any part of the plate to which the element may be set; means for locking and further projecting said element after it has passed through the plates and cards; a movable plate adapted to be moved by said element as it is passed through any of said perforations; a pair of receptacles; a deflector operatively connected to said movable plate for deflecting said cards; and means for conveying cards from the perforated plates to the deflector and thence to the receptacles.

13. In a multi-sorter, the combination of a card hopper; a pair of superposed perforated sorting plates; an analyzing element adapted to pass through alined perforations of said plates and a perforation in a card therein; means for feeding cards from the hopper to between said plates; a sorted card receptacle; an unsorted card receptacle near the sorted card receptacle; means for conveying the cards along a path from said plates to and into the sorted card receptacle; a deflector for deflecting cards from said path; means operated by said element for deflecting a card from said path; means for conveying the deflected card from said deflector to and into the unsorted card receptacle; and packers for packing the conveyed cards in said receptacles.

14. In a sorting element for multi-sorters, the combination of a card hopper; analyzing card supports; a sorted card receptacle; an unsorted card receptacle disposed above the sorted card receptacle; feeding means for feeding the cards from said hopper on to the analyzing supports; a sorting element coöperating with said supports and the card thereon; a deflector; means for feeding the cards from said analyzing supports to said deflector; and means operatively connecting said deflector with said sorting element whereby according to the data of the cards the deflector is positioned either to convey the cards upwardly into the unsorted card receptacle or to the sorted card receptacle, the position of the unsorted card receptacle facilitating the removal of the cards which are to be further sorted.

15. In a multi-sorter, the combination of a card magazine; an analyzing device; a pair of receptacles disposed one above the other; a deflector controlled by the analyzing device; means from feeding the cards from the magazine to the analyzing device; and conveying means for conveying the cards from the analyzing device to the deflector and thence upwardly to one or the other receptacles, said conveying means maintaining continuous hold on the cards until they are finally positioned in the receptacles in the same relative order and facing direction as they were in the magazine.

16. In a multi-sorter, the combination of a card magazine; an analyzing device; a pair of receptacles; a deflector controlled by the analyzing device; means for feeding the cards from the magazine to the analyzing device; and conveying means for conveying the cards from the analyzing device to the deflector and thence upwardly to one or the other receptacle, said conveying means maintaining continuous hold on the cards until they are placed in the receptacles and placing them in the same relative order and facing direction as they were in the magazine.

17. In a multi-sorter, the combination of a card magazine; an analyzing device; a pair of receptacles disposed one above the other; a deflector controlled by the analyzing device; means for feeding the cards from the magazine to the analyzing device; and conveying rollers for conveying the cards from the analyzing device to the deflector and thence upwardly to one or the other receptacle, said conveying rollers maintaining continuous hold on the cards until they are placed in the receptacles and placing them in the same relative order and facing direction as they were in the magazine.

18. In a multi-sorter, the combination of a card magazine; an analyzing device; a pair of receptacles; a deflector controlled by the analyzing device; means for feeding the cards from the magazine to the analyzing device; and conveying rollers for conveying the cards from the analyzing device to the deflector and thence upwardly to one or the other receptacle; conveying means maintaining continuous hold on the cards until they are placed in the receptacles in the same relative order and facing direction as they were in the magazine.

19. In a multi-sorter, the combination of a card magazine; an analyzing device; a pair of receptacles one above the other; a deflector controlled by the analyzing device; means for feeding the cards from the magazine to the analyzing device; and conveying means for conveying the cards from the analyzing device to the deflector and thence upwardly to one or the other receptacles, said conveying means maintaining continuous hold on the cards until they are placed in the receptacles and placing them in the same relative order and facing direction as they were in the magazine.

20. A multi-sorter having a plurality of sorting machines, a card hopper for each sorting machine, an analyzing card support, a sorted card receptacle for each sorting machine, an unsorted card receptacle for each sorting machine, feeding means for feeding the cards from said hoppers into analyzing position in said sorting machines, deflectors, means for feeding the cards from analyzing position to said deflectors, means operatively connecting said deflectors with said sorting machines whereby the cards according to their data are either conveyed to the unsorted card receptacles or not, a vertically reciprocal frame common to all the sorting machines, carriages on said frame, a carriage for each sorting machine, analyzing pins on said carriages, one for each carriage, each pin set for a different setting, and means for reciprocating said frame so that all of the pins will simultaneously coöperate with the several analyzing card supports.

21. A multi-sorter having a plurality of sorting elements, a card hopper for each sorting element, analyzing card supports, a sorted card receptacle for each sorting element, an unsorted card receptacle for each sorting element, feeding means for feeding the cards from said hoppers on to said analyzing supports, deflectors, means for feeding the cards from said analyzing supports to said deflectors, means operatively connecting said deflectors with said sorting elements whereby the cards according to their data are either conveyed to sorted or unsorted card receptacles, card packers for each of the card receptacles, brackets, shafts on which said card packers are mounted, said shafts being secured to said brackets, and means common to all the sorting elements for actuating said brackets whereby all of said card packers will be simultaneously actuated to pack the cards into said receptacles.

22. A multi-sorter having a plurality of sorting elements, a card hopper for each sorting element, analyzing card supports, a sorted card receptacle for each sorting element, an unsorted card receptacle for each sorting element, feeding means for feeding the cards from said hoppers on to said analyzing supports, deflectors, means for feeding the cards from said analyzing supports to said deflectors, means operatively connecting said deflectors with said sorting elements whereby the cards according to their data are either conveyed to the sorted or the unsorted card receptacles, weights disposed in said card receptacles against which the cards to be fed into the receptacles will rest, card packers for each of the card receptacles, brackets, shafts on which said card packers are mounted, said shafts being secured to said brackets, and means common to all the sorting elements for actuating said brackets whereby all of said card packers will be simultaneously actuated to pack the cards in said receptacles against said weights, the weights gradually receding from said card packers according to the number of cards being fed into the receptacles in which they are disposed.

23. In a multi-sorter having a plurality of sets of card supporting plates provided with registering openings, a frame common to all the card supporting plates reciprocably mounted relative thereto, carriages on said frame one for each set of card supporting plates, an analyzing pin on each carriage shiftably mounted thereon, and means for reciprocating said frame whereby all of said analyzing pins will be simultaneously actuated to coöperate with their respective card supporting plates.

24. In a multi-sorter having a set of card supporting plates provided with registering openings, a reciprocably mounted analyzing pin shiftable to coöperate with any set of registering openings of said set of card supporting plates, a common depressible member disposed below said set of card supporting plates to be engaged by said analyzing pin when the card supported corresponds to the setting of the analyzing pin, means for locking the pin before it engages the depressible member, a sorted card receptacle, and a deflector in operative relation with said depressible member so that the actuation of said depressible member will actuate said deflector to permit the sorted card to be conveyed into said sorted card receptacle.

25. In a multi-sorter having a plurality of sets of card supporting plates provided with registering openings, a frame common to all the card supporting plates reciprocably mounted relative thereto, carriages on said frame, one for each set of card supporting plates, an analyzing pin mounted on each carriage, a stop pin in operative relation to each set of sorting plates, a rod common to all the stop pins connected to said frame and connected to said stop pins to positively raise said stop pins with said frame, an operative connection between said stop pins and said rod whereby said rod may descend without lowering said stop pins below the surface of a card being supported, a card picker for each sorting element for feeding the card to the several card supporting plates, and a driving means for each sorting element for actuating its card picker, said stop pins being operatively connected to said driving means to disconnect same from a picker plate when permitted to descend.

26. In a multi-sorter having a plurality of sets of card supporting plates provided with registering openings, a frame common to all the card supporting plates reciprocably mounted relative thereto, carriages on said frame, one for each set of card supporting plates, an analyzing pin mounted on each carriage, a stop pin in operative relation to each set of sorting plates, a rod common to all the stop pins connected to said frame and connected to said stop pins to positively raise said stop pins with said frame, an operative connection between said stop pins and said rod whereby said rod may descend without lowering said stop pins below the surface of a card being supported, a card picker for each supporting element for feeding the card to the several card supporting plates, a driving means for each sorting element for actuating its card picker, said stop pins being operatively connected to said driving means to disconnect same from a picker plate when permitted to descend, feed rollers for each sorting element for feeding the cards through said card supporting plates, driving means for the feed rollers on each sorting element independent of one another, and means for disconnecting the several driving means from the feed rollers independent of one another.

27. In an apparatus of the character described, the combination of a yieldable follower support, a packer, and means for placing articles between said packer and support.

28. In an apparatus of the character described, the combination of a yieldable follower support tending to remain in any operative position; a packer; and means for placing articles between said packer and support.

29. In an apparatus of the character described, the combination of a yieldable follower support; a reciprocatory packer; and means for placing articles between said packer and support.

30. In an apparatus of the character described, the combination of a yieldable follower support; a reciprocatory packer; and means for placing articles between said packer and support when the packer has been moved away from the support.

31. In an apparatus of the character described, the combination of a yieldable follower support; a movable packer; and means for placing articles between said packer and support when the packer has been moved away from the support.

32. In an apparatus of the character described, the combination of a yieldable follower support tending to remain in any operative position; a reciprocatory packer; and means for placing articles one-by-one between said packer and support when the packer has been moved away from the support.

33. In an apparatus of the character described, the combination of a card receptacle; a follower support yieldably disposed in said receptacle and tending to remain in any operative position; a reciprocatory packer; and means for placing cards in the receptacle.

34. In an apparatus of the character described, the combination of a card receptacle; a follower support yieldably disposed in said receptacle; a reciprocatory packer; and means for placing cards in the receptacle between the packer and said support.

35. In an apparatus of the character described, the combination of a card receptacle; a follower support yieldingly disposed in said receptacle and tending to remain in any operative position in which it is placed; a reciprocatory packer; and means for placing cards in the receptacle between the packer and said support.

36. In an apparatus of the character described, the combination of a card receptacle having a flat lower wall; an inclined follower support frictionally resting upon said wall; a packer adapted to reciprocate toward and away from said follower support; and means for placing cards between said packer and support.

37. In an apparatus of the character described, the combination of a card receptacle having a flat lower wall; an inclined follower support frictionally resting upon said wall; a packer adapted to reciprocate toward and away from said follower support; and means for placing cards one-by-one between said packer and support when the packer has been moved away from the support.

JAMES POWERS.

Witnesses:
    GUSTAV DREWS,
    H. D. PENNEY.